United States Patent
Le Coz et al.

(10) Patent No.: US 10,377,955 B2
(45) Date of Patent: Aug. 13, 2019

(54) DEVICE FOR COOLING HEAT TRANSFER SOLID FOR PRECISELY CONTROLLING THE TEMPERATURE, SAID DEVICE OPTIONALLY BEING ASSOCIATED WITH AN ENDOTHERMIC OR EXOTHERMIC PROCESS

(71) Applicant: AXENS, Rueil Malmaison (FR)

(72) Inventors: Jean-Francois Le Coz, Saint Germain en Laye (FR); Yann Le Vot, Paris (FR)

(73) Assignee: AXENS, Rueil Malmaison (FR)

(*) Notice: Subject to any disclaimer, the term of this patent is extended or adjusted under 35 U.S.C. 154(b) by 0 days.

(21) Appl. No.: 15/783,791

(22) Filed: Oct. 13, 2017

(65) Prior Publication Data
US 2018/0105752 A1 Apr. 19, 2018

(30) Foreign Application Priority Data
Oct. 14, 2016 (FR) .................... 16 59947

(51) Int. Cl.
| | |
|---|---|
| F22B 31/00 | (2006.01) |
| C10G 11/18 | (2006.01) |
| B01J 38/32 | (2006.01) |
| B01J 8/18 | (2006.01) |
| F28D 13/00 | (2006.01) |

(52) U.S. Cl.
CPC ............ C10G 11/18 (2013.01); B01J 8/1836 (2013.01); B01J 38/32 (2013.01); F22B 31/0023 (2013.01); F28D 13/00 (2013.01); B01J 2208/00132 (2013.01); C10G 2300/807 (2013.01)

(58) Field of Classification Search
CPC ... C10G 11/18; C10G 2300/807; F28D 13/00; F22B 31/0023; B01J 38/32; B01J 8/1836; B01J 2208/00132
See application file for complete search history.

(56) References Cited

U.S. PATENT DOCUMENTS

| | | |
|---|---|---|
| 5,351,749 A | 10/1994 | Lai et al. |
| 7,273,543 B2 | 9/2007 | Letzsch |
| 2014/0150735 A1* | 6/2014 | Caruzzi .................. F28F 9/013 122/235.14 |

FOREIGN PATENT DOCUMENTS

| | | |
|---|---|---|
| CN | 104368279 A | 2/2015 |
| WO | 2005017074 A1 | 2/2005 |

OTHER PUBLICATIONS

English machine translation of CN104368279A published Feb. 25, 2015 to Wang Qing-xin of Anhui Xinyue Chemical Equipment Co Ltd.

* cited by examiner

*Primary Examiner* — Randy Boyer
*Assistant Examiner* — Juan C Valencia
(74) *Attorney, Agent, or Firm* — Millen, White, Zelano and Branigan, P.C.

(57) ABSTRACT

The present invention describes a device for controlling cooling of a heat transfer solid supplying or withdrawing heat to or from a unit carrying out globally endothermic or exothermic reactions respectively. The exchange bundle of said device is in a triangular pattern.

11 Claims, 7 Drawing Sheets

# DEVICE FOR COOLING HEAT TRANSFER SOLID FOR PRECISELY CONTROLLING THE TEMPERATURE, SAID DEVICE OPTIONALLY BEING ASSOCIATED WITH AN ENDOTHERMIC OR EXOTHERMIC PROCESS

CONTEXT OF THE INVENTION

The present invention relates to a heat exchanger for cooling a catalytic or non-catalytic solid, said solid acting as a heat transfer solid. The heat exchanger of the invention is thus connected to the process via at least one conduit. In a first configuration, a conduit for supplying "hot" solid from the unit carrying out the process towards the exchanger and a conduit for returning "cold" solid from the exchanger to that same unit mean that the exchanger is traversed by a flow of solid. The exchanger may also be in communication with a reservoir of fluidized solid by means of a single conduit through which catalyst passes to and fro accomplished by means of turbulent mixing between the exchanger and the reservoir.

Said exchanger essentially consists of a steam generation bundle immersed in a fluidized bed constituted by particles of solid to be cooled. For this reason, this exchanger will be said to be in fluidized bed mode in the remainder of the text.

More particularly, the invention concerns the field of the regeneration of a catalyst operated in a fluidized bed unit and more precisely the device for controlling the temperature of said catalyst removed from one point of the regeneration zone and returned to another point of said regeneration zone. This device is known as a "catalyst cooler" in the context of catalytic cracking units. Because the present invention goes beyond the context of catalytic cracking, which constitutes just one point of application, in this text the present device will henceforth be termed a fluidized bed solids exchanger or fluidized cooler.

More generally, the invention may be applied to any heat transfer solid which transports its heat to a reaction zone in a chemical or physical transformation process the temperature of which has to be controlled by means of an exchanger generating steam.

More particularly, the invention concerns the fluidized bed regeneration of catalysts, particularly those charged with hydrocarbon residues and coke, as a result of a reaction with a feed of heavy hydrocarbons. In particular, it is applicable to the regeneration of hydrotreatment catalysts, catalytic cracking catalysts or catalytic hydrocracking catalysts, reforming catalysts, or to the regeneration of contact masses for thermal cracking, or in fact to circulating fluid burning (CFB). In general, the invention may concern any type of process requiring a heat transfer solid, whether that process itself is endothermic or exothermic, and involving a solid which is employed in a fluidized state.

The majority of catalytic processes are cracking processes during which hydrocarbon molecules with a high molecular weight and a high boiling point are split into smaller molecules with lower boiling points.

Among such processes, the most usual process used in the refinery is the fluidized bed catalytic cracking process (Fluid Catalytic Cracking), abbreviated to FCC. In this type of process, the feed of hydrocarbons is simultaneously vaporized and brought into contact at high temperature with a cracking catalyst which is maintained in suspension in the vapours from the feed. After reaching the desired range of molecular weights by cracking, with a corresponding reduction in the boiling points, the catalyst is separated from the products obtained.

In this type of process, the cracking reactions take place almost instantaneously when the feed is brought into contact with the catalyst. However, this results in rapid deactivation of the catalyst due to adsorption of the hydrocarbons onto the surface of the catalyst, and in the formation of a deposit of coke on the active sites of the catalyst by dehydrogenation and condensation of heavy molecules. The reactivation necessary for the catalyst is initially carried out continuously by stripping the catalyst, for example using steam or inert gas, then secondly by eliminating all or a portion of the coke formed during the reaction by means of a controlled combustion, generally in the presence of air which may be depleted in oxygen. This air depleted in oxygen is essentially used in certain processes for which the catalyst is highly sensitive to high temperatures.

The regenerated catalyst is then generally withdrawn from the regenerator, then recycled towards the bottom of the reactor, known as a "riser" in a FCC unit, in which the cracking reaction occurs; the catalyst and the effluents are in vertical upflow mode.

The FCC process is naturally carried out in a manner such that the cracking unit is in thermal equilibrium. In other words, the energy supplied by the hot regenerated catalyst can satisfy the various thermal requirements of the reaction section, namely principally: pre-heating of the liquid feed, vaporization of that feed, supply of the heat required by the cracking reactions which overall are endothermic, and compensation for the loss of heat from the unit.

Exchangers inside the regeneration zone have been proposed in the past, but using an exchanger external to said regeneration zone is preferred because it has a number of advantages. The term "external to" should be understood to mean outside the regeneration zone.

The use of an external heat exchanger of the fluidized bed solids exchanger type means that the catalyst removed from the regeneration zone can be cooled and that its temperature can be controlled much better before it is reinjected into said zone.

Another advantage of an external exchanger compared with an exchanger located in the regeneration zone is that it can operated in a fluidized bed which is less turbulent than in the bed of the regenerator, which means that less severe conditions can be employed from the point of view of abrasion. Fluidization at a more moderate velocity means that bare steel tubes which are not coated with anti-abrasion protection can be used.

An external exchanger means that a specific fluidization can be employed, and thus the thermal exchange coefficient can be controlled independently of the remainder of the facility.

Many patents describe the external devices or those integrated into the fluidized bed solids exchanger type regeneration zone, in particular the patents U.S. Pat. Nos. 2,970,117, 4,396,531, 4, 822,761, which may be considered to form part of the prior art.

The patent U.S. Pat. No. 5,351,749 describes a "cat cooler" which can be used to control the temperature of a catalyst during its regeneration and which can be used with a regenerator for a FCC type catalytic cracking process. The arrangement of the device of the present invention is principally distinguished from that described in the cited text in that the cooling pins located in the fluidized bed solids exchanger have, in a horizontal section, a triangular motif, and in that the shape of the distribution and collection chambers (termed the "manifold") for the cooling fluid also has a different geometry.

The patent FR 2 932 495 describes a catalytic cracking unit comprising two reactors with an ascending flow of catalyst (termed a "riser"), a first reactor dedicated to the production of gasoline, and a second dedicated to the production of propylene. Each of these reactors is supplied with catalyst obtained from a dedicated fluidized bed solids exchanger, in order to provide for independent regulation of the temperature and contact time in the two reactors.

That patent does not provide accurate details of the arrangement of the fluidized bed solids exchangers, in particular the shape of the exchange bundle.

The patent U.S. Pat. No. 4,965,232 describes a fluidized bed regeneration process which is operated continuously, in which a portion of the catalyst from the second regeneration zone is sent to a heat exchanger which may be external to the regeneration. That exchanger is not specified and may be any type which is known to the person skilled in the art.

The present invention describes a geometry for a fluidized bed cooler which can be used to improve compactness and limit the risks of movement of the pins constituting the exchanger under the effect of the fluidization.

In particular, the fluidized bed solids exchanger in accordance with the present invention may ideally be used in a catalytic cracking unit with one or two "risers", or even reactors with a descending flow known as "downflow reactors". In general, the present fluidized bed exchanger may be used in any process which requires a heat transfer solid which communicates with the reaction zone in the fluidized state.

BRIEF DESCRIPTION OF THE FIGURES

FIG. 2 represents a longitudinal section of the interior of the fluidized bed solids exchanger with its array of exchange tubes.

FIG. 3 represents a section of the fluidized bed solids exchanger along the axis BB of FIG. 2, and can be used to visualize the organization of the exchanger into a triangular pattern.

FIG. 4 represents a top view of the fluidized bed solids exchanger which complements FIG. 3.

FIG. 5 provides details concerning the protective modules (11) and the connections between the exchanger tubes in sectional view (FIGS. 5a and 5b and 5c).

BRIEF DESCRIPTION OF THE INVENTION

Figure 1:
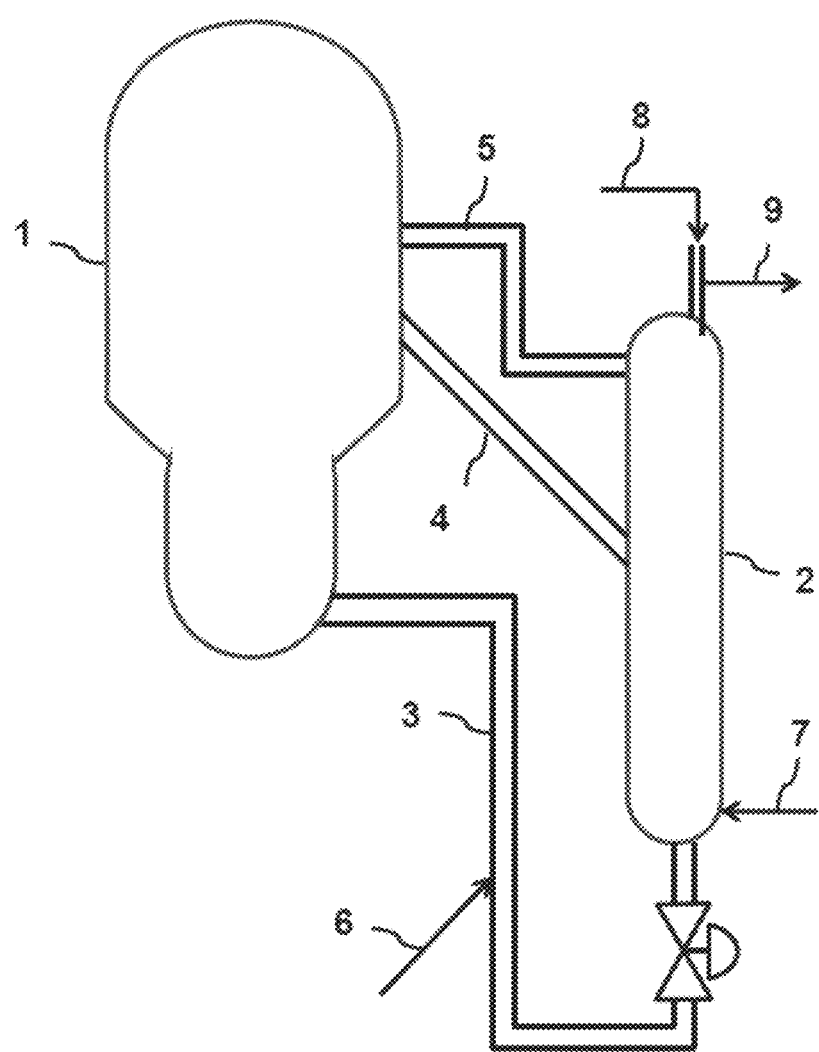
FIG. 1, in accordance with the prior art, diagrammatically describes the link between the regenerator, for example a catalytic cracking unit, with the vessel termed the fluidized bed solids exchanger.

The present invention can be defined as a device for allowing a controlled exchange of heat from a heat transfer solid supplying its heat to a unit carrying out globally endothermic reactions or, vice versa, removing heat from a unit carrying out globally exothermic reactions.

More precisely, the present device can be used to control the temperature of the heat transfer solid before it is reintroduced into the reaction zone of said process.

The device in accordance with the present invention consists of an exchange bundle for generating steam, said bundle being immersed in a fluidized bed of solid, and said fluidized bed being contained in a vessel communicating with the reaction zone of the process via at least one conduit for introducing "hot" solid (4).

In some cases, the device immersed in the fluidized vessel communicates with the reaction zone via two distinct conduits, a conduit (4) for introducing solid into the fluidized exchanger, and a conduit (3) for evacuating solid after exchange.

The exchange bundle of the fluidized cooling device in accordance with the invention is constituted by an assembly of vertical tubes grouped into fours, a central bayonet type tube (8)/(9) divided at its lower end into three tubes (10) substantially parallel to the tube (8)/(9) and disposed symmetrically about said bayonet tube (8)/(9) in order to form, in top view, a symmetrical assembly in the form of a trefoil.

The assembly constituted by the bayonet tube (8)/(9) and the three parallel tubes (10) is termed the elementary motif of the exchange bundle, or bundle module.

The device for cooling a heat transfer solid in accordance with the invention thus has an exchange bundle in which the various modules formed by the bayonet tube (8)/(9) and the three tubes of type (10) are disposed in a triangular pattern in a manner such as to occupy the section of the cooling device as completely as possible.

The lower portion of the module formed by the tube (8)/(9) and the three tubes (10) is preferably equipped with a jacket (11) which is placed around the junctions between the tube (8) and the three tubes (10) in a manner such as to protect them both thermally and mechanically.

The protective jacket (11) is preferably lined with an anti-abrasion material which is self-casting and has a high density.

The density of the assemblies of tubes (8)/(9) and the three tubes (10) is generally in the range 10 to 40 units/m$^2$, preferably in the range 15 to 30 units/m$^2$, and more preferably in the range 20 to 25 units/m$^2$ of cooler section.

The diameter of the central tube (9) is preferably in the range 30 to 150 mm, and more preferably in the range 50 to 75 mm, and the diameter of the tubes (8) and (10) is preferably in the range 40 to 200 and more preferably in the range 75 to 125 mm. These refer to the external diameters of these tubes (8), (9) and (10).

The device in accordance with the present invention may be used in a process for generating steam in which liquid water is introduced via the upper end of the central tubes (9), drops to the bottom of these tubes, and the water/steam mixture rises along the coaxial tube (8) and the three parallel tubes (10).

The device in accordance with the present invention may be used in a process in which the temperature at the inlet for the fluidized cooler is in the range between the temperature of the saturated steam at the pressure of the steam to be produced and the maximum admissible temperature set by the metallurgy of the exchange tubes. By way of illustration, when the saturated temperature of the high pressure steam at 4.5 MPa is close to 260° C., the catalyst will necessarily have a temperature of more than 260° C.

The invention does not intrinsically impose an upper temperature limit; it is only the metallurgy of the tubes which sets an upper boundary. In catalytic cracking, a temperature of 815° C. is generally considered to be the maximum admissible temperature.

The device in accordance with the present invention may also be used in a process for the catalytic cracking of hydrocarbon cuts, in which the fluidization velocity in the cooling vessel is in the range 0.05 to 0.5 m/s and preferably in the range 0.1 to 0.3 m/s.

DETAILED DESCRIPTION OF THE INVENTION

The present invention concerns a device for controlling the temperature of a catalyst or, more generally, of a solid divided into multiple particles in the fluidized state, as well as to the use of this device in a catalytic or non-catalytic process, in which the regeneration of said solid is operated in fluidized bed mode.

The present invention may thus be defined as a device for allowing the controlled exchange of heat for a heat transfer solid supplying heat to a unit carrying out globally endothermic reactions or, in contrast, for removing heat from a unit carrying out globally exothermic reactions.

The device and the process in accordance with the invention may in particular be implemented during the regeneration of catalysts for the hydrotreatment of hydrocarbons, catalysts for catalytic reforming, for the isomerization of paraffins or olefins, for the production of aromatics from methyl bromide, for the production of xylene by the methylation of toluene, for catalytic cracking or for catalytic hydrocracking, or in fact for the regeneration of contact masses for thermal cracking, or indeed for the fluidized bed combustion or circulating fluid burning. The remainder of the text is compiled in the context of a catalytic cracking unit which is taken by way of example; this in no way constitutes a limitation to the field of application of the present invention.

The description of the invention is supported by FIGS. 1 to 7.

FIG. 1, in accordance with the prior art, describes a process layout in which the fluidized bed solids exchanger (2) is associated with a regenerator (1). In a catalytic cracking process, the cracking reaction takes place in a riser (terminology corresponding to a reactor operating with a rising flow of a fluidized bed of catalyst) or a dropper (terminology corresponding to a reactor operating with a falling flow of fluidized catalyst). After the reaction zone, there is a disengagement zone for separating the catalyst from the gaseous cracking effluents. The coked catalyst is sent to the regenerator (1). In fact, during the cracking reactions, a deposit of coke is formed on the surface of the catalyst and causes it to lose its activity. Thus, the catalyst has to be regenerated before it is reintroduced into the reactor.

This regeneration essentially consists of a controlled combustion of the coke deposited at the surface of the catalyst. During the regeneration, the temperature of the catalyst is a minimum of 650° C. and may rise to temperatures of the order of 800° C. to 900° C., and the heat supplied by the catalyst is used to vaporize the hydrocarbon feed and for the endothermic cracking reactions. Nevertheless, in the case of heavy feeds, the thermal balance of the unit means that there is a surplus of heat over the requirements of the unit.

The heat exchange zone (2) containing the fluidized bed solids exchanger can be used to evacuate the surplus heat generally by producing high pressure steam. The fluidized, hot catalyst is sent to the fluidized bed solids exchanger via the conduit (4) and returns to the regenerator after cooling via the conduit (3), transported by a conveying gas supplied via the conduit (6) which can be used to fluidize and entrain the catalyst towards said regenerator (1). It may also be directed towards other parts of the facility, for example the riser. The conduit (7) can be used to supply the fluidized bed solids exchanger (2) with gas in order to fluidize the catalyst in the vessel (2).

The temperature of the bed of solid in the exchanger is regulated by means of the flow rate of the solid passing through the equipment by means of a restricting valve placed in a low position on the conduit (6). The conduit (5) can be used to evacuate the fluidization gas from the fluidized bed solids exchanger (2) and send it to the regenerator (1). The tubes (8), (9) and (10) can be used to supply the exchange bundle immersed in the fluidized bed with water and to recover the water/steam mixture at the exchanger outlet.

In one embodiment of the invention, the fluidized bed solids exchanger (2) is located outside the regeneration zone (1) and communicates therewith by means of conduits (3) and (4) as described above.

The invention consists of a particular arrangement of the fluidized bed solids exchanger, and in particular of the bundle of the internal exchanger immersed in the fluidized bed. This internal exchanger is in the form of a bundle of tubes extending along a substantially vertical axis through the entire length of the vessel (2), the tubes being of two types, either single tubes (10) or double tubes, known as bayonets with an internal tube (9) and a concentric external tube (8) surrounding the internal tube (9). The internal tube (9) is used for the liquid to descend and the annular portion included between the two concentric tubes (8) and (9) is used to lift the liquid/steam mixture. In the remainder of the text, for simplification, the term "bayonet tubes (8)/(9)" will be used, knowing that the annular portion of this tube acts to lift the liquid/steam mixture.

Figure 2:
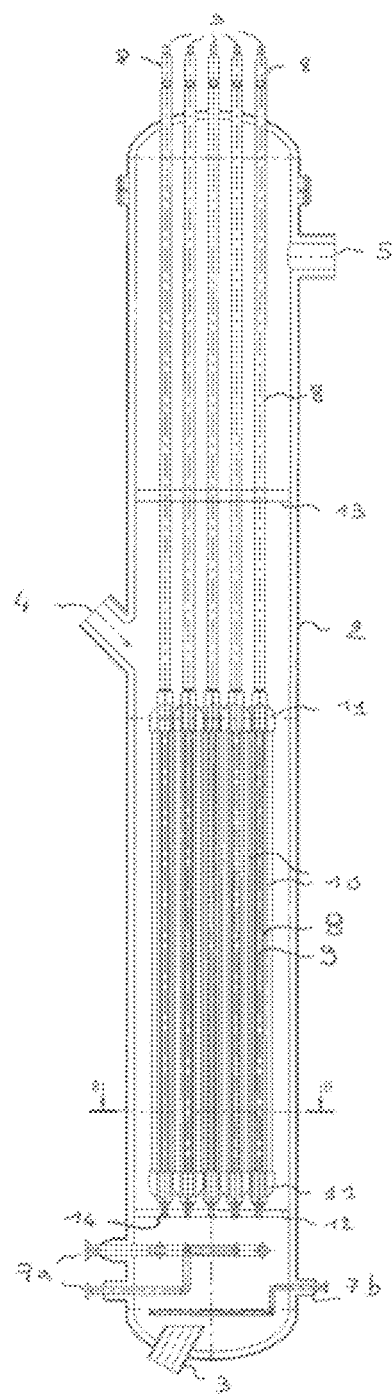
FIGS. 2 to 5 describe the fluidized bed solids exchanger in accordance with the invention in more detail.

FIG. 2, in accordance with the invention, shows a sectional view of the fluidized bed solids exchanger (2) over its entire length and allows the internal exchanger in accordance with the invention to be visualized. The hot catalyst obtained from the regenerator arrives in the fluidized bed solids exchanger via the conduit (4) at a temperature which is generally in the range 650° C. to 800° C. Inside the fluidized bed solids exchanger (2), the bundle of tubes (8, 9, 10) carries out the exchange of heat. The exchanger in accordance with the invention generally has a diameter in the range 0.5 to 10 meters, preferably in the range 1 to 5 meters.

The assembly formed by a bayonet tube (8)/(9) and the three tubes (10) constitutes the modular motif of the exchange bundle as will be explained in more detail for FIGS. 3, 4 and 5 below. For simplification, this will be termed the exchange bundle module.

The internal tube (9) is used for liquid to descend, and the annular portion included between the two concentric tubes (8) and (9) is used to lift the liquid/steam mixture.

These tubes (8) and (10) are connected together at certain points, for example by welding, and these connections form collectors which are protected by the devices described in FIG. 5. The stud (14) welded to the lower portion of each module of the exchange bundle acts both to close the end of the tubes (9) and to suspend a first assembly of triangulated rods (12) which loosely connects the exchange bundle modules together, in order to buffer displacements of the tubes in a substantially horizontal direction, and to prevent the tubes of the various modules of the bundle from colliding with each other or from striking the wall of the vessel of the fluidized bed solids exchanger (2).

A second assembly of triangulated rods (13) located at an upper level with respect to the first assembly (12) can also be used to limit the vibrations of the tubes in a horizontal plane, and thus to maintain them at a distance which is always substantially constant from each other.

The inlets 7a and 7b can admit air, steam (or any inert gas) acting as the gas for fluidizing the particles of catalyst so as to maintain the bed of catalyst in a fluidized state, which guarantees that it does not pile up, and facilitates its flow towards the outlet (3). In general, the fluidization velocity, calculated as the ratio of the fluidization flow rate to the free section of the exchanger, is in the range 0.05 to 0.5 m/s, preferably in the range 0.1 to 0.3 m/s.

The flow rate of gas introduced via the inlets 7a and 7b also allows the fluidization velocity to be modulated, and thus allows the heat exchange coefficient between the bed of catalyst and the exchange bundle to be regulated. The cooled fluidized catalyst is returned to the regenerator via the conduit (3).

Figure 3:
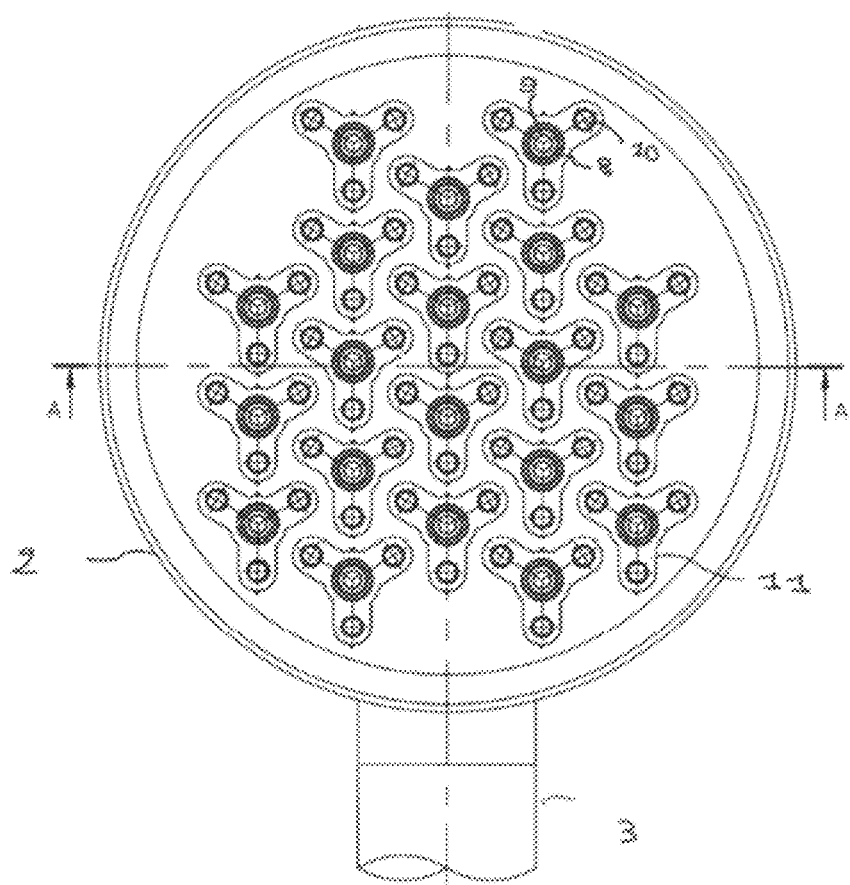

FIG. 3, in accordance with the invention, shows a sectional view of the fluidized bed solids exchanger (2) along the axis BB of FIG. 2. FIG. 3 clearly shows the organization of the tubes (8), (9) and (10).

The water descends from the upper end of the tubes (9) to the lower end of said tube and rises in the liquid-vapour state via the outer concentric tube (8) and the three tubes (10). The pattern of a contiguous assembly of tubes (8), (9) and (10) is triangular, and the pattern made by the various bayonet tubes (8)/(9) is also triangular. This configuration ensures a maximum compactness of the exchange bundle.

Figure 4:
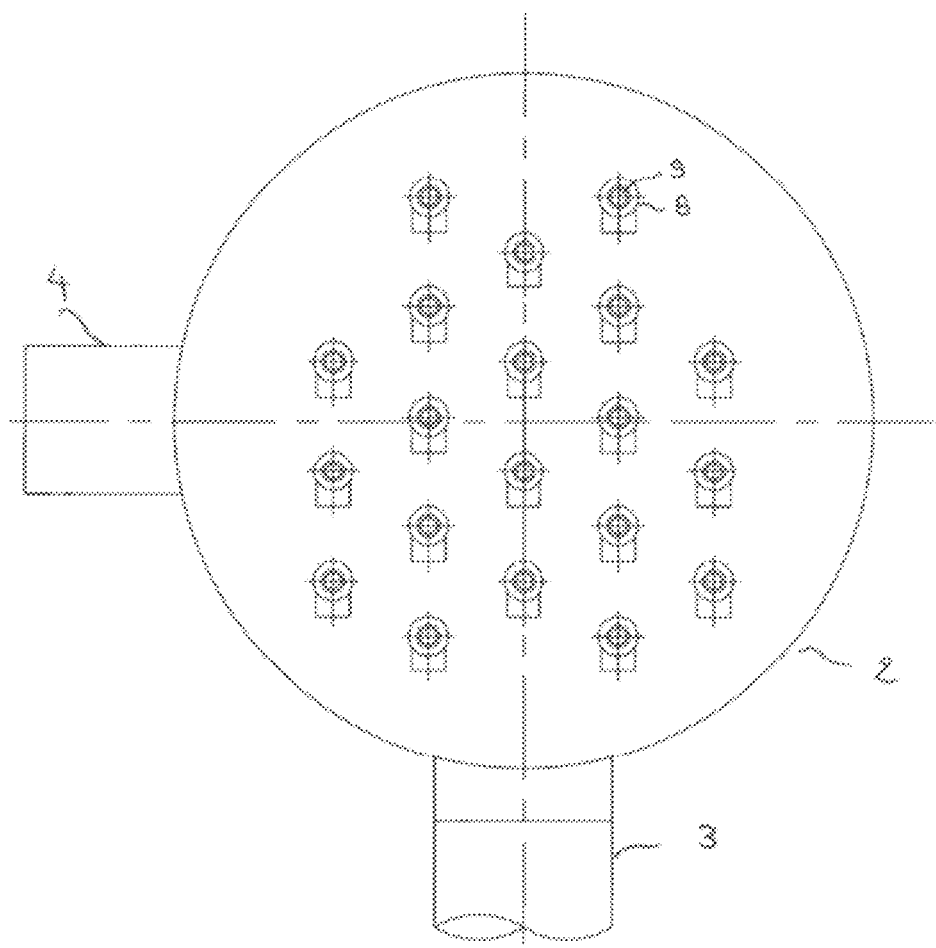

FIG. 4, in accordance with the invention, is a top view of the fluidized bed solids exchanger located above the shell (2) and can be used to understand how the upper end of the bayonet tubes (8)/(9) is arranged. The water/steam mixture moving upwardly in the annular portion included between the concentric tubes (8) and (9) is passed into a T junction, the various T junctions then possibly being connected together in one or more stages in order to constitute the outlet conduit for the steam produced.

FIG. 5, in accordance with the invention, illustrates several details of the embodiment concerning the jackets (11).

Figure 5B:
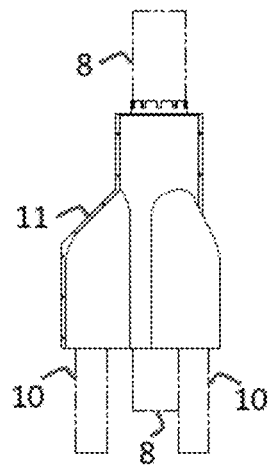
Figure 5A:
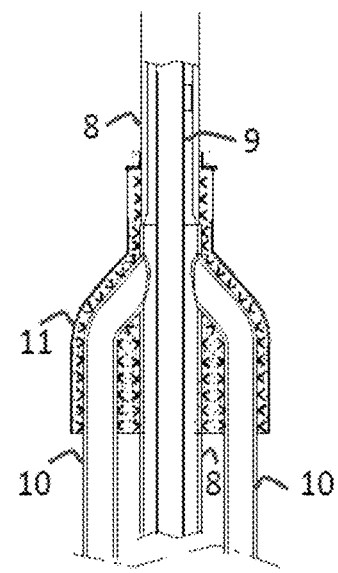
Figure 5A:
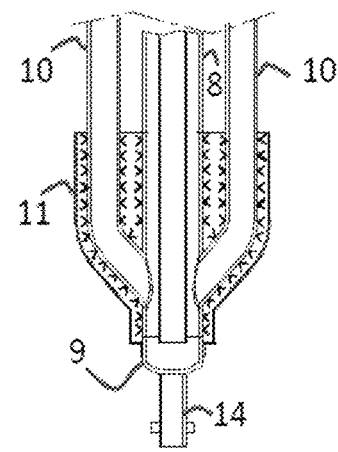

FIG. 5a can be used to understand how liquid leaves the lower end of a tube (9), then the liquid/steam mixture rises, on the one hand in the annular portion defined by the two concentric tubes (8) and (9), and on the other hand in the three riser tubes (10).

Starting from the open lower end of a downer tube (9), the water is divided into 4 circuits, the annular riser circuit (8), and 3 circuits for flowing upwards via the three tubes (10) disposed in a triangular pattern around the bayonet tube (8)/(9).

Figure 5C:
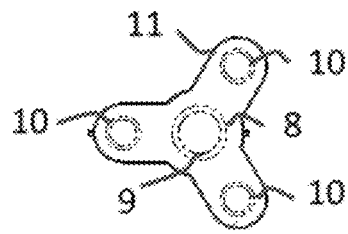

FIGS. 5b and 5c show the positioning of the upper and lower protective jackets (11). These jackets play both an anti-heating and an anti-abrasion role for the weld zone of the three tubes (10) around the tube (8). In FIG. 5c, it will be seen that the protective jacket (11) not only protects the exterior of the tubes (10), but also protects the interior portion extending between the tubes (10) and the tube (8). FIG. 5c also shows that the jackets (11) have a symmetrical trefoil shape. The three tubes (10) thus form a triangular pattern centred around the bayonet tube (8)/(9).

These protective jackets (11) are disposed at an elevation above and below the junctions between the tubes (10) and tube (8). They may be produced by assembling pressed and/or welded plates, and act as a mould for filling with a material which has the function of thermal insulation and mechanical protection. A preferred example of a material is refractory concrete of the same type as that employed as a coating in catalytic cracking units in the regeneration zone. Examples of such materials are R-MAX MP from Resco or Actchem 85; this list is not exhaustive.

It is also possible to use a fusible material (polymer) in order to mould the protective jackets (11); the material will melt as the facility starts up, leaving the refractory anti-abrasion material exposed.

The assembly of the bayonet tube (8)/(9) and the three riser tubes (10) constitutes a bundle exchange module, the overall exchange bundle being constituted by combining various modules, and these various modules being arranged in a triangular pattern so as to cover the section of the fluidized bed exchanger as best as possible.

Figure 6A:
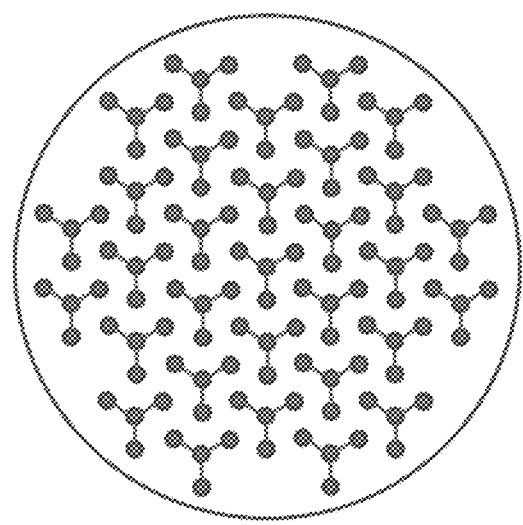
FIG. 6 shows a sectional view of the exchanger in accordance with the invention (6a) and in accordance with the prior art (6b) for the same internal diameter.
Figure 6B:
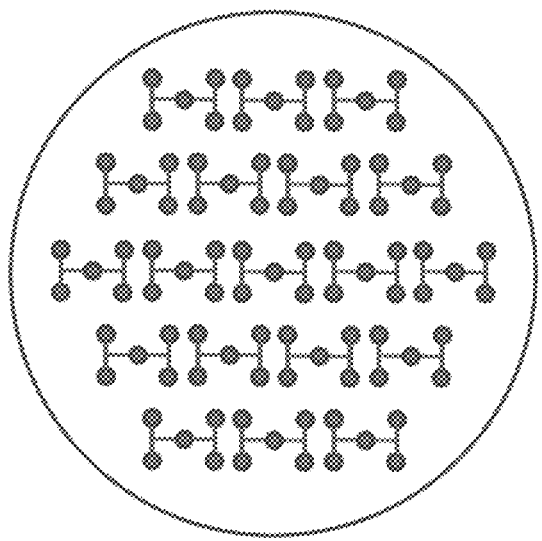

The triangular arrangement of the steam generation tubes of the invention can be used to obtain an optimized spatial distribution of the tubes from the point of view of using the section of the fluidized bed solids exchanger (2). This arrangement is shown in FIG. 6a, while FIG. 6b shows a far less compact arrangement which is in accordance with the prior art.

Using a triangular pattern inside a circular section is much more advantageous than in the prior art, where a square or rectangular motif generates very significant dead zones at the edges. These dead zones result in a loss of efficiency, not only because of the absence of exchange tubes, but also because they leave an open passage. This gives rise to preferential pathways for a fraction of the hot catalyst which can easily short-circuit the exchange bundles and return to the regenerator having been cooled less as a result. Thus, the invention can be used to render the thermal exchange more homogeneous and, overall, improve the thermal efficiency and facilitate the flow of the catalyst.

In summary, the invention concerns a device which can allow a controlled exchange of heat for a heat transfer solid used in an endothermic or exothermic process having at least one reaction zone, said device consisting of an exchange bundle immersed in a fluidized bed of solid, said fluidized bed being contained in a vessel (2) communicating with the reaction zone via at least one conduit (4) for introducing solid, and said exchange bundle being constituted by an assembly of longitudinal tubes grouped into fours, a central bayonet type tube (8)/(9) divided at its lower end into three tubes (10) substantially parallel to the tube (8)/(9) and disposed symmetrically about said bayonet tube (8)/(9) in order to form, in top view, a symmetrical assembly in the form of a trefoil termed the exchange bundle module.

Preferably, in the device in accordance with the invention, the various modules formed by the bayonet tube (8)/(9) and the three tubes of type (10) are disposed in a triangular pattern in a manner such as to occupy the section of the cooling device as completely as possible.

In accordance with a variation of the device in accordance with the invention, the lower portion of each module formed by the tube (8)/(9) and the three tubes (10) is equipped with a jacket (11) which is placed around the junctions between the tube (8) and the three tubes (10) in a manner such as to protect them both thermally and mechanically.

Preferably, the protective jacket (11) is produced from an anti-abrasion material which is self-casting and has a high density.

Preferably, the density of the modules formed by the tubes (8)/(9) and the three tubes (10) is in the range 10 to 40 assemblies/m$^2$ of cooler surface. Preferably, the diameter of the central tube (9) is in the range 30 to 150 mm, and the diameter of the tubes (8) and (10) is in the range 40 to 200 mm.

In accordance with the invention, said fluidized bed of solid is preferably contained in a vessel (2) communicating with the reaction zone via at least one conduit (4) for introducing solid, and at least one conduit (3) for evacuating solid.

The invention also concerns a process for generating steam using the device in accordance with the invention, in which liquid water is introduced via the upper end of the central tubes (9), drops to the bottom of these tubes, and the water/steam mixture rises along the coaxial tube (8) and the three parallel tubes (10).

The invention also concerns an endothermic or exothermic process using the device in accordance with the invention.

Preferably, the invention concerns a process for the catalytic cracking of hydrocarbon cuts using the device in accordance with the invention. In this case, more preferably, the temperature of the solid at the inlet to the cooler is in the range 700° C. to 815° C., and the temperature of the solid at the outlet from the cooler is in the range 550° C. to 770° C.; and preferably, the fluidization velocity in the cooler vessel is in the range 0.05 to 0.5 m/s.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 16/59.947, filed Oct. 14, 2016.

EXAMPLE IN ACCORDANCE WITH THE INVENTION

An example of the dimensions is given below for an internal diameter of the exchanger of 2500 mm. The application is an exchanger for a catalytic cracking unit intended to cool the catalyst in a controlled manner. FIGS. 6a and 6b can be used to compare the arrangements in accordance with the invention and in accordance with the prior art, for the same pitch of 400 mm between the centres of the tube bundle modules.

The tube density is much higher with the exchanger in accordance with the invention. It should be noted that the total exchange surface is higher with the bundle in accordance with the invention even though the exchange surface per module is smaller. This arises from the better density, and thus the greater number of modules housed in the fluidized vessel of the exchanger.

|  | Invention | Prior art |  |
| --- | --- | --- | --- |
| Internal diameter of the exchanger | 2500 | 2500 | mm |
| Inlet temperature of solid | 770 | 770 | ° C. |
| Outlet temperature of solid | 620 | 620 | ° C. |
| Temperature of refrigerant (liquid water/steam) | 260 | 260 | ° C. |
| Number of tubes per module | 4 | 5 |  |
| Tube length (mm) | 6300 | 6300 | mm |
| External diameter of peripheral tubes | 75 | 75 | mm |

|  | Invention | Prior art |  |
| --- | --- | --- | --- |
| External diameter of central tubes | 120 | 120 | mm |
| Heat exchange coefficient | 460 | 460 | kW/ (m$^2$ · K) |
| Exchange surface of one module | 6.8 | 8.3 | m$^2$ |
| Number of modules in exchange bundle | 31 | 19 |  |
| Total exchange surface | 211 | 158 | m$^2$ |
| Heat output | 36 | 27 | MW |
| Height of exchanger | 15000 | 15000 | mm |

Figure 7:
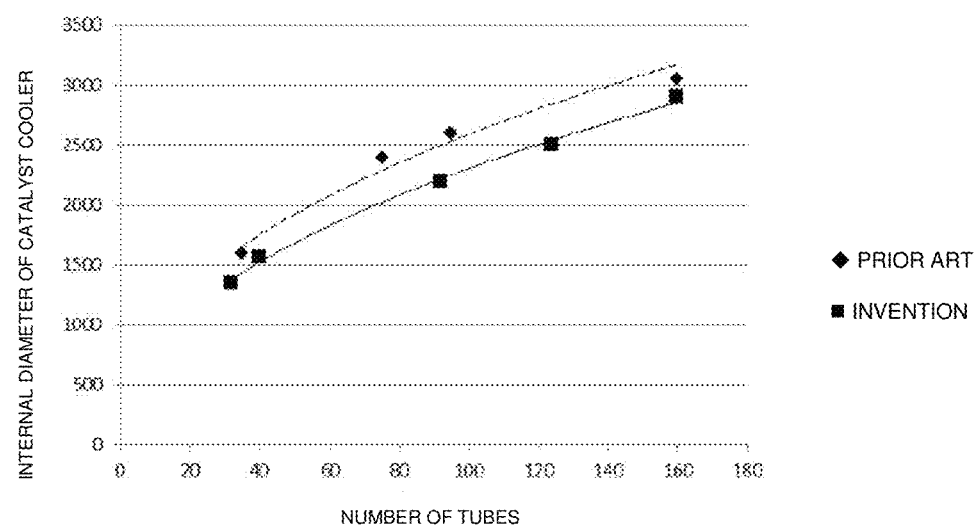
FIG. 7 compares the efficiency of the geometry of a fluidized bed solids exchanger in accordance with the invention with that of the prior art.

FIG. 7 represents the variation in the number of tubes which can be provided inside the fluidized vessel of the exchanger as a function of the diameter of that vessel, and can be used to compare the configuration of the invention (solid curve) with the prior art curve (dashed line curve).

It illustrates the improved compactness of the bundle in accordance with the invention and for a range of exchanger diameters.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device capable of exchanging heat of a heat transfer solid in the fluidized state and capable of carrying out a controlled exchange of heat from a heat transfer solid used in an endothermic or exothermic process, said device comprising at least one reaction zone, an exchange bundle immersed in a fluidized bed of solid, said fluidized bed being contained in a vessel (2) communicating with the reaction zone via at least one conduit for introducing solid (4), and said exchange bundle comprising an assembly of longitudinal tubes grouped into fours, a bayonet type tube (8)/(9) comprising a central tube (9) and a tube (8) coaxial with the tube (9) and surrounding it, and three tubes (10) parallel to the tube (8)/(9) and disposed symmetrically about said bayonet tube (8)/(9) in order to form, in top view, a symmetrical assembly in the form of a trefoil, termed the exchange bundle module, each exchange bundle module comprising junctions to connect together the tube (8) coaxial with the central tube (9) and the three tubes (10) parallel to the bayonet tube (8)/(9).

2. The device capable of exchanging heat of a heat transfer solid in the fluidized state as claimed in claim 1, in which the various modules formed by the bayonet tube (8)/(9) and the three tubes (10) parallel to the bayonet tube (8)/(9) are disposed in a triangular pattern in a manner such as to occupy the section of said exchange device as completely as possible.

3. The device capable of exchanging heat of a heat transfer solid in the fluidized state as claimed in claim 1, in which the lower portion of each module formed by the bayonet tube (8)/(9) and the three tubes (10) parallel to the bayonet tube (8)/(9) is equipped with a jacket (11) which is placed around the junctions between the tube (8) which is coaxial with the tube (9) and the three tubes (10) parallel to the bayonet tube (8)/(9) in a manner such as to protect them both thermally and mechanically.

4. The device capable of exchanging heat for a heat transfer solid in the fluidized state as claimed in claim 3, in which the protective jacket (11) is produced from an anti-abrasion material which is self-casting and has a high density.

5. The device capable of exchanging heat for a heat transfer solid in the fluidized state as claimed in claim 1, in which the density of the modules formed by the bayonet tubes (8)/(9) and the three tubes (10) parallel to the bayonet tube (8)/(9) is in the range 10 to 40 per m$^2$ of exchange device surface.

6. The device capable of exchanging heat for a heat transfer solid in the fluidized state as claimed in claim 1, in which the diameter of the central tube (9) is in the range 30 to 150 mm, and the diameter of the tubes (8) coaxial with the tube (9) and the three tubes (10) parallel to the bayonet tube (8)/(9) is in the range 40 to 200 mm.

7. The device capable of exchanging heat for a heat transfer solid in the fluidized state as claimed in claim 1, in which said fluidized bed of solid is contained in a vessel (2) communicating with the reaction zone via at least one conduit (4) for introducing solid, and at least one conduit (3) for evacuating solid.

8. A process comprising generating steam in the heat exchange device as claimed in claim 1, in which liquid water is introduced via the upper end of the central tubes (9), drops to the bottom of these tubes, and the water/steam mixture rises along the coaxial tube (8) and the three parallel tubes (10).

9. A process for the catalytic cracking of hydrocarbon cuts, comprising subjecting a hydrocarbon cut to catalytic cracking conditions in the presence of a catalyst in the device as claimed in claim 1.

10. The catalytic cracking process as claimed in claim 9, in which the temperature of the solid at the inlet to the heat exchanger device is in the range 700° C. to 815° C., and the temperature of the solid at the outlet from the heat exchanger is in the range 550° C. to 770° C.

11. The catalytic cracking process as claimed in claim 9, in which the fluidization velocity in the heat exchanger device is in the range 0.05 to 0.5 m/s.

* * * * *